(No Model.) 5 Sheets—Sheet 1.

D. LA MONT ASPINWALL.
COMBINED AGRICULTURAL IMPLEMENT.

No. 317,276. Patented May 5, 1885.

Witnesses:
Charles S. Hyer.
Russell A. Scott.

Inventor:
D Lamont Aspinwall
By Chas Marble
Atty.

(No Model.) 5 Sheets—Sheet 2.
D. LA MONT ASPINWALL.
COMBINED AGRICULTURAL IMPLEMENT.

No. 317,276. Patented May 5, 1885.

Witnesses:
Charles S. Heyer.
Russell N. Scott.

Inventor:
D Lamont Aspinwall
By O. M. Marble
Atty (No Model.) 5 Sheets—Sheet 3.
D. LA MONT ASPINWALL.
COMBINED AGRICULTURAL IMPLEMENT.
No. 317,276. Patented May 5, 1885.
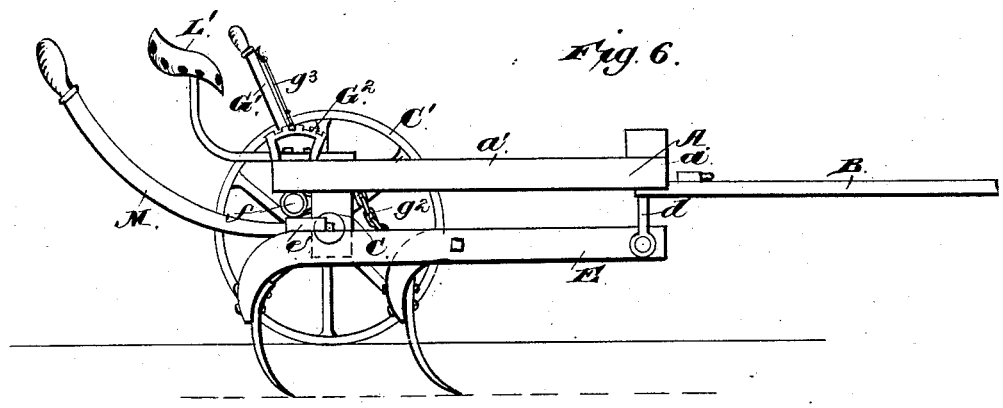
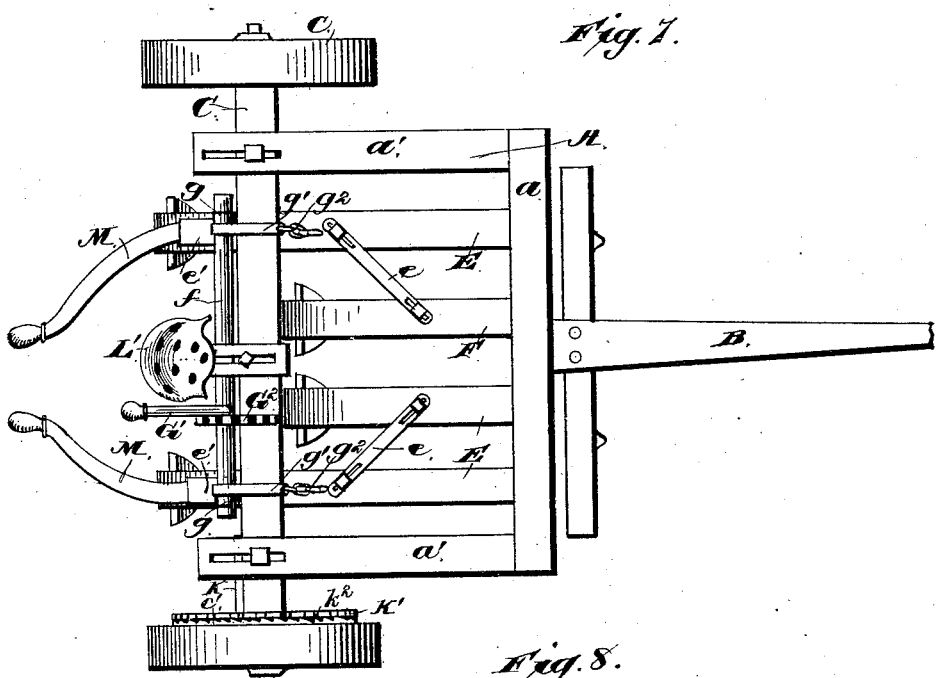
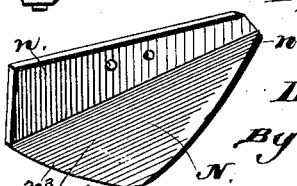
Witnesses:
Charles S. Hyer
Russell H. Scott
Inventor:
D Lamont Aspinwall
By Emmarble
Atty.

(No Model.) 5 Sheets—Sheet 4.

D. LA MONT ASPINWALL.
COMBINED AGRICULTURAL IMPLEMENT.

No. 317,276. Patented May 5, 1885.

Witnesses:
Charles S. Hyer.
Russell A. Scott.

Inventor:
D. Lamont Aspinwall.
By Ocumstle
Atty.

N. PETERS. Photo-Lithographer, Washington, D. C.

(No Model.) 5 Sheets—Sheet 5.

D. LA MONT ASPINWALL.

COMBINED AGRICULTURAL IMPLEMENT.

No. 317,276. Patented May 5, 1885.

Witnesses:
Charles S. Hyer
Russell H. Scott

Inventor:
D Lamont Aspinwall
By Emmart &c
Atty.

N. PETERS, Photo-Lithographer, Washington, D. C.

UNITED STATES PATENT OFFICE.

D. LA MONT ASPINWALL, OF PORTSMOUTH, ASSIGNOR OF ONE-HALF TO J. H. VAN AUKEN, OF PETERSBURG, VIRGINIA.

COMBINED AGRICULTURAL IMPLEMENT.

SPECIFICATION forming part of Letters Patent No. 317,276, dated May 5, 1885.

Application filed January 5, 1885. (No model.)

*To all whom it may concern:*

Be it known that I, D. LA MONT ASPINWALL, a citizen of the United States, residing at Portsmouth, in the State of Virginia, have invented certain new and useful Improvements in Combined Cultivators, of which the following is a specification, reference being had to the accompanying drawings.

My invention relates to a combined agricultural implement; and it consists of the construction, arrangement, and adaptation of the parts to form various styles of implements from one machine, which will be more fully hereinafter described, and specifically pointed out in the claims.

The object of my invention is to construct a cotton-cultivator which in one case combines a cultivator, a fertilizer-distributer, a cotton-planter, and means for operating the several parts thereof, and by the interchanging of some of the parts and substitution of others to adapt the machine to be used as an after-cultivator and a gang-plow, which is all effected easily and by simple and light construction of the parts, which renders the entire machine of great value to cotton-planters and to agriculturists generally. I attain these objects by the mechanism illustrated in the accompanying drawings, wherein like letters of reference indicate like parts in the several views, and in which—

Figure 1:
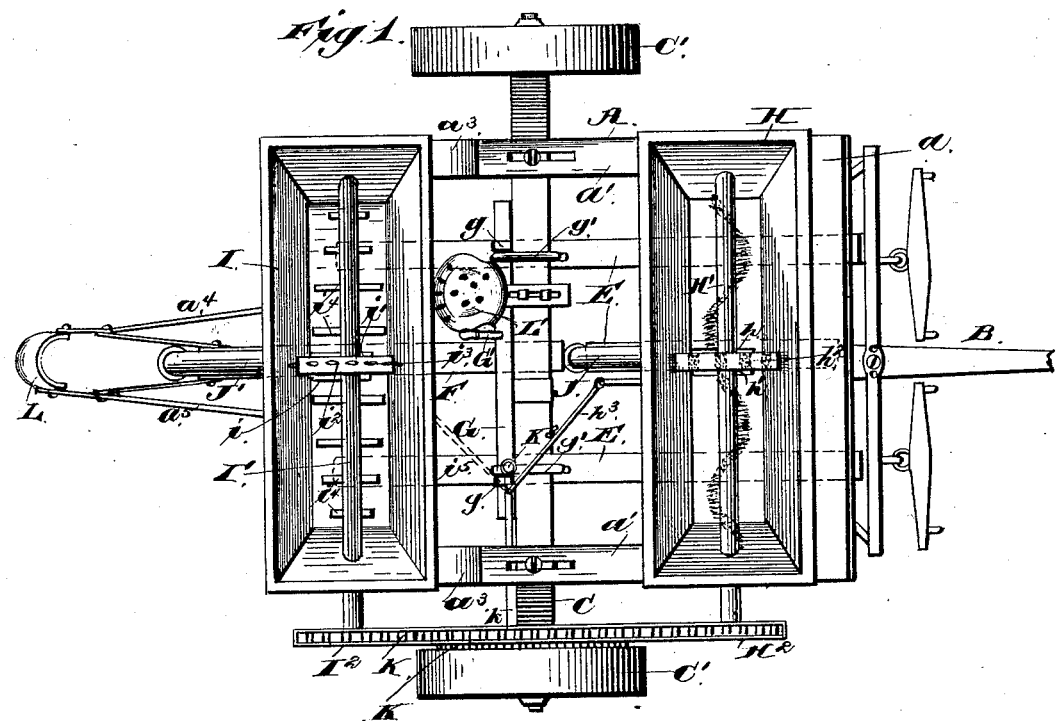
Figure 2:
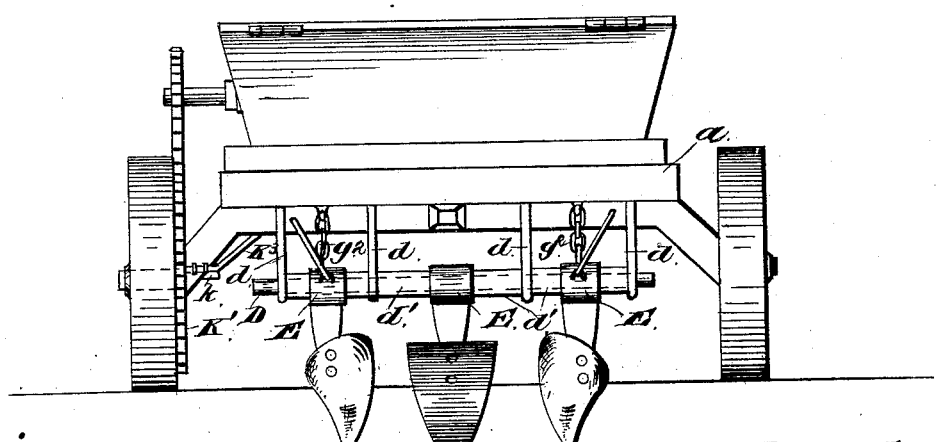
Figure 5:
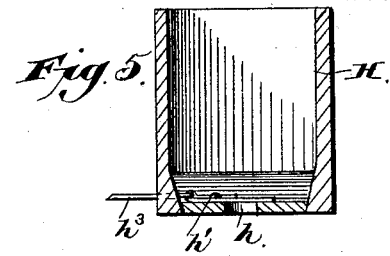
Figure 3:
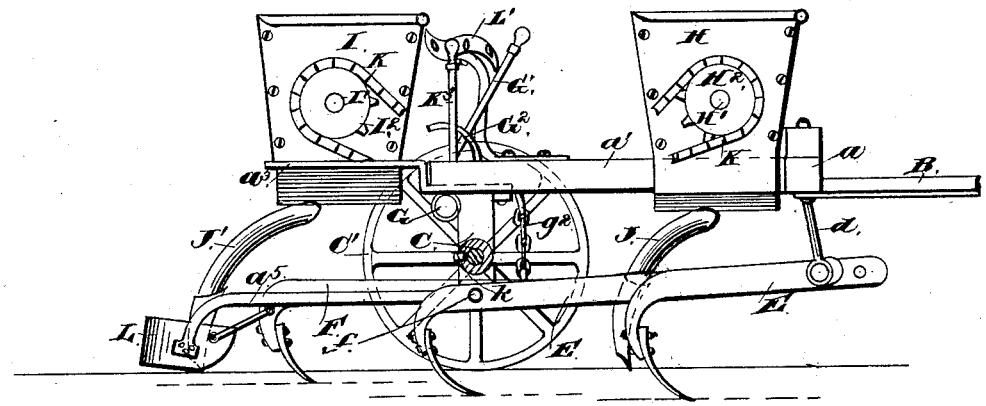
Figure 4:
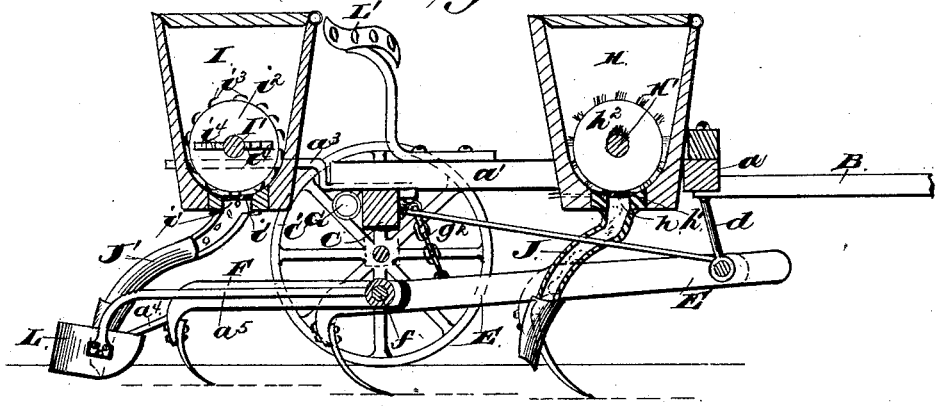
Figure 14:
Figure 9:
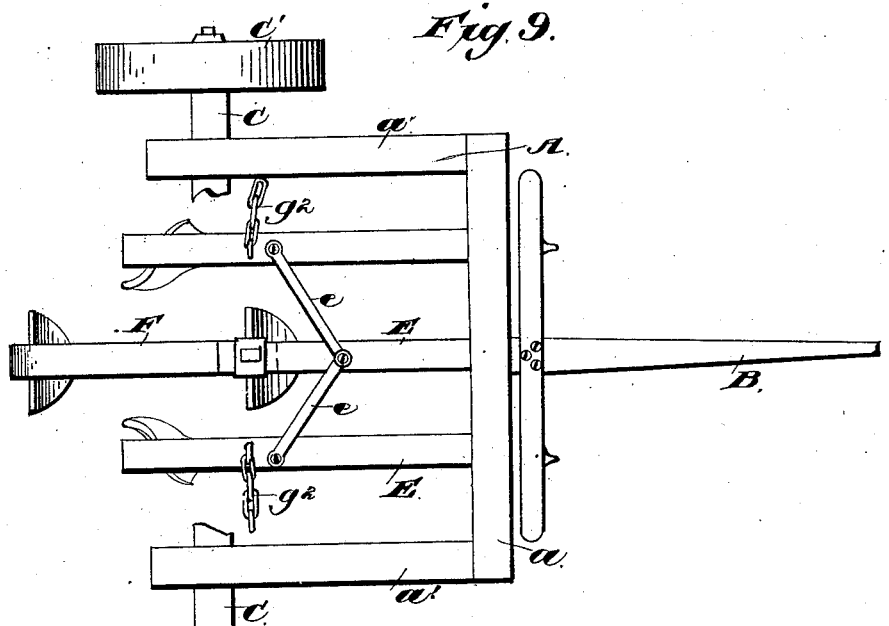
Figure 10:
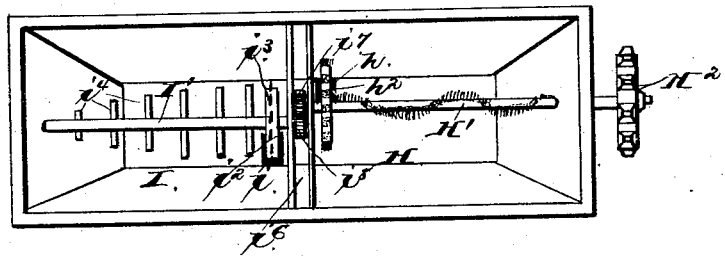
Figure 11:
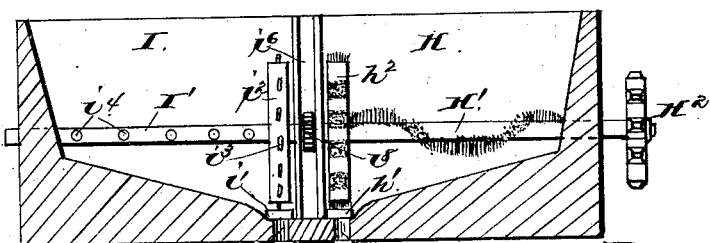
Figure 12:
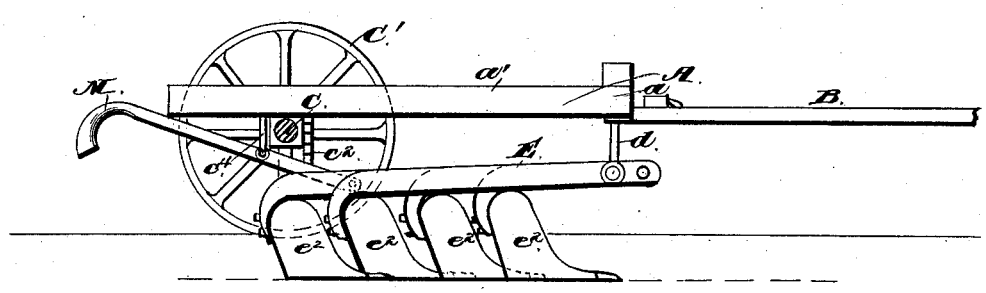
Figure 13:
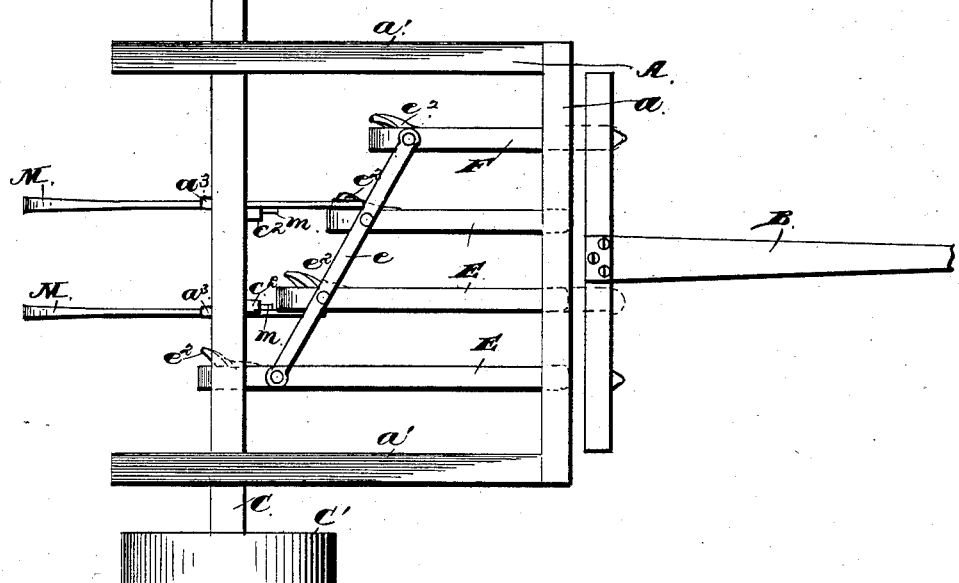

Figure 1 is a plan view of my improved implement arranged as a cultivator, cotton-planter, and fertilizer-distributer. Fig. 2 is a front elevation of the machine as arranged in Fig. 1. Fig. 3 illustrates a side elevation of the same machine, with one of the wheels removed. Fig. 4 is a longitudinal section of the same. Fig. 5 is a detail section of either the cotton or fertilizer box, showing the feed-slide. Fig. 6 is a side elevation of the machine as converted into a straddle-plow cultivator. Fig. 7 is a plan view of the machine as illustrated in Fig. 6. Fig. 8 is a detail perspective of a scraper-blade or weeder, which is applied to any one form of cultivator. Fig. 9 is a plan view of the machine as a cultivator, with the plans arranged in a different manner. Fig. 10 is a plan view of the feeding-box, illustrating a single box used for the double purpose of a fertilizer-distributer and cotton-planter. Fig. 11 is a longitudinal section of the double box. Fig. 12 illustrates the machine converted into a gang-plow. Fig. 13 is a plan view of the machine arranged as a gang-plow. Fig. 14 is an elevation of one of the wheels, showing the driving mechanism.

A represents the frame of the machine, which is made adjustable, having a fore beam, $a$, and side beams, $a'$ $a'$, and is used in all of the forms into which the machine may be converted. This frame has a draft beam or tongue, B, attached to the fore beam, $a$, and an axle-beam, C, attached to the side beams, $a'$ $a'$, and fastened to this axle-beam C are the wheels $C'$ $C'$.

Supported by brace-rods $d$ $d$, attached to the fore beam, $a$, of the main frame A, is a bearing bar or rod, D, of light metal, which supports several of the plow-beams E E. As illustrated, I have shown four brace-rods, $d$, between which the ends of the plow-beams are held by the said bearing-rod D, and are separated one from another or given the requisite spacing distance by small collars $d'$ $d'$, which are placed on the rod D as the plow-beams are inserted in position. Passing through the two outside or longer plow-beams at their rear portion is a cross brace-rod, $f$, which carries the end of a rear plow-beam, F, which is also of the same length as the central plow-beam, E, just forward of it.

A rotating rod or bar, G, attached by suitable braces, $g$, to the axle-beam C, is used, as in similar machines, for raising and lowering the beams E and F of the plow or cultivating portion of the machine. By means of short link-bars $g'$ $g'$, attached to the rotating rod G at one of their ends and connected to chains $g^2$, which are attached to two of the plow-beams at their outer ends, an operating-lever, $G'$, is fastened rigidly to the rod G, and operated, as is well known, in a ratcheted sector, $G^2$, by means of a spring-pawl and its rod $g^3$.

In consequence of the rigidity of the plow-beams on account of the brace-rods heretofore described they are all simultaneously raised or lowered when the operating-lever G' is turned up or down through the medium of the chains $g^2$ and link-bars $g'$.

On the forward portion of the main frame A a fertilizer-distributing box, H, is placed, which is made to slide on the frame by means of flanges or recesses; or it can be secured to the frame by bolts. This fertilizer-box H has sloping sides, so as to throw the fertilizing material to a central point, where a feed-opening, $h$, is cut, having a slide-plate, $h'$. Through the center of the box a shaft, H', is mounted, which carries or has mounted thereon at or near its center a brush-wheel, $h^2$, which revolves immediately above the opening $h$ in the box. The brushes on the wheel $h^2$ act to keep the fertilizing material from clogging at the opening $h$, and make it distribute more evenly. The shaft H' is also provided with spiral brushes, which facilitate the flow of the fertilizer toward the central opening, so that a continuous unintermittent flow will be kept up.

On the rear portion of the frame A, or attached thereto by extended arms or braces $a^3$ $a^3$, is a cotton-seed box or distributer, I, having sloping sides and opening $i$, with a slide, $i'$. A shaft, I', runs through the center of this box, as in box H, and has also a wheel, $i^2$, mounted in the center thereof and directly over the feed-opening $i$. On this wheel $i^2$ is a series of short wires or hooks, $i^3$, which act to draw the cotton-seed down to the opening $i$, and also to keep them from packing at the point directly under the wheel. On the shaft I' is a series of small rods or beaters, $i^4$, entered at right angles therefrom, and graduated from the center toward the end of the box, so as to draw the seed down toward the center opening, $i$, or feed. From the under side of each of these boxes H and I conveying-tubes J and J', with suitable boots, are attached immediately over the openings $h$ and $i$, and convey the fertilizer and seed to the ground, in a manner which will be presently described.

On the end of each of the shafts H' and I', which extend out from the boxes H and I, are mounted suitable sprocket-wheels, $H^2 I^2$, which are turned by a chain-belt, K, passing around them, and down around a larger sprocket or drive wheel, K'. This drive-wheel K' turns on the axle of the machine, and, as illustrated, is adjacent to one of the wheels C'. Attached to this drive-wheel K' is an operating spline-lever, $k$, which may be partially let into the axle to give it a firm movement, and which is operated by a lever, $K^3$, which extends up above the frame A, and is operated by the driver. On one of the wheels C' a clutch, $c'$, is secured or cast integral therewith, which engages with a corresponding clutch, $k^2$, on the drive-wheel K'. This clutch mechanism is operated by the lever K', which in turn acts to draw or shove the clutch $k^2$ on drive-wheel K' from or into engagement with the clutch $c'$ on the wheel C' through the medium of the spline-lever K.

To the lever K' are secured two smaller levers, $h^3$ and $i^5$, which are connected at their other ends to the slides $h'$ and $i'$, which cover the openings $h$ and $i$ in the boxes H and I. By this arrangement the moment the clutch mechanism is disengaged the feeding-apertures of the two boxes H and I are closed, so that no material from either box is wasted or planted where it is not wanted, and also permits of the continuing of the use of the cultivator by itself, if preferred.

At the rear of the machine, and held by suitable brace-rods, $a^4 a^5$, a follower-hood, L, is secured, being mounted immediately back of the cotton-seed-feeding tube, and through which it passes.

The driver's seat L' may be placed in any suitable position on the frame; or it may be placed in the rear of the boxes, as the case may require.

The operation of the machine, combined as heretofore described, is as follows: The central forward plow on beam E cuts its furrow, and the fertilizer feed-pipe J, which extends from box H down behind the said central plow, distributes the fertilizing material. The two longer plow-beams E E on each side of the forward central one just described, and extending somewhat in the rear thereof, contain mold-boards, which close the ground in over the fertilizing material. The rear central plow, F, then opens up a furrow in the wake of forward central plow, E, but not as deep as said plow E. The cotton-seed-feeding tube J', which extends from its reservoir-box I, runs down behind the plow F, which extends on the rear of the two longer side plows, and the seed is planted near the depth of the fertilizer, when the follower-hood L, which is mounted slightly on an incline, again turns the ground in upon the seed just previously dropped, and so continues the same operation until the amount of seed that is in the box is exhausted. By this simultaneous action the ground is enriched, the fertilizing substance is covered, and a furrow is then made for the reception of the seed adjacent to the fertilizing material, but not in contact therewith, and the furrow again covered by a single operation.

In Figs. 10 and 11 a modification in the construction of the reservoir-box is illustrated. By this construction a double box having two compartments, H and I, with a hollow partition, $i^6$, is employed.

Instead of using a single shaft, two short shafts, H' and I', which enter the box from either end, are used, and both run through into the space of the hollow partition $i^6$, and have on each of their ends small gear-wheels $i^7$ and $i^8$, which mesh with each other. The one shaft, $i^8$, extends to the outside of and away from the one end of the box, and has mounted on its end a sprocket-wheel, $I^2$, which engages with a chain-belt, K, which transmits motion to the same from the drive-wheel K' and the two shafts rotated. These shafts $i^7$ and $i^8$ do not occupy a central position in the box, because the pitch will be different in the two compartments, and the shafts have to be arranged to accommodate the position of the wire-toothed wheel $i^2$ and brush-wheel $h^2$, situated, respectively, in the cotton-seed compartment I and in the fertilizer-division H.

The shaft $H^2$ in the fertilizer-division H is constructed with spiral brushes surrounding it in the same manner as illustrated and described in the single box of Fig. 1. In like manner the shaft $I^2$ of the cotton-seed compartment has the short graduated wire extensions branching from it. The incline in these two compartments are the reverse of each other, the one in the division H slanting in a different direction from the compartment I. This is so constructed as to bring the greatest slope toward either outer edge, near where the opening and slide in each box will be situated, and which are operated just the same as in the single boxes, having feed-pipes J and J' extending from said openings, and occupying the same relative positions as described in the single-box construction. This double box is set nearer the rear of the machine, as indicated in dotted lines in Fig. 9, and the driver's seat and lever mechanism can be constructed to operate in the rear of said box.

In Figs. 6 and 7 the machine is illustrated in the form of a cultivator alone. The plow-beams E and F are arranged nearly the same as in Fig. 1, with the exception that the central rear beam is brought forward into engagement with the bearing-rod D, the other central or forward short beam, E, having been previously shoved to one side to admit of an even arrangement of the four beams. In this device the plows are of the nature of straddle-plows; or they may be arranged with two shovel-plows in the center and two mold-boards on the outside. The beams of these plows are held by the adjustable brace-rods $e$, and the lifting mechanism and driver's seat are arranged similar to those of Figs. 1 and 2. On the rear of the two outside beams may be secured two metal straps, $e'$, which are adapted to engage with handles M M, which may or may not be used for operating the plows. If the handles are dispensed with, the seat can be so arranged that the driver can operate the beams with his feet.

In Fig. 8 a form of scraper or weeder, N, is shown, which is applied to the cultivator at a desired point, and operating between the rows of cotton to cut the weeds out. This scraper or weeder N consists of a landside, $n$, which rides next the cotton, and a flat bottom plate, $n'$, which may curve down slightly at its edges. The contour of this bottom plate, $n'$, is nearly the shape of a half-heart, and by this contour a point, $n^2$, is obtained at the front end, and a broad portion, $n^3$, at its rear. This weeder N is attached to any of the forms desired, and may be used for other purposes than those described.

In Fig. 9 the plow-beams E and F are arranged similar to those in Fig. 1, with the exception that the short rear plow-beam, F, is fastened directly to the short front plow-beam, E, still leaving said beam F in the rear of all the other plows. By this modification a less amount of mechanism is used than is shown in Fig. 1, thus lightening the weight of the machine and accomplishing the same purpose. In this construction the same lifting-levers and mechanism are used, and handles may or may not be used with the said gang of plows, which may be either shovel-plows or mold-boards and landsides.

In Figs. 12 and 13 the machine is illustrated as converted into a gang-plow. The rear tie-rod or support, $f$, is taken out, and the plow-beam F is brought forward and brought into engagement with the bearing-rod D. The first long side plow, E, is left in its same position as in the other forms heretofore described. The second long side plow is taken from its original position by its withdrawal from the bearing-rod D, and is brought over adjacent to the first long beam, but made shorter than the same by ordinary adjusting-holes in the end of said beam. The first central short plow-beam is moved a little farther over and away from the beam last inserted, and the short rear plow-beam, F, is placed upon the farther side of the bearing-rod D and adjusted up a little shorter than the short beam E next to it. These beams are all fastened together by means of the cross-brace $e$, which is attached to them by means of suitable bolts. These beams carry mold-board blades $e^2$, which are all arranged to turn the ground to one side or the other, as the operator may think best. Attached to the outside of two of the central beams are two handles, M M, and which are pivoted to the said beams, extending out to some distance beyond the rear of the machine. Attached to the axle-beam C are two toothed metal strips, $c^2$, which extend downward and engage with the lugs or projections $m$ on the handles M M. On the opposite or rear side of the beam C are two bifurcated projections, $a^3$, which have jaws which engage the upper ends of the short levers $c^4$, which extend downward therefrom, and are pivoted to the plow-handles M M, and act as follows: When it becomes necessary to raise the plows from contact with the ground in changing the furrow, or to regulate the depth of cut of the plow-blades, the operator lifts up handles M M, thus raising the gang of plow-beams, and the lugs $m$ on the said handles engage with the toothed ratcheted strips $c^2$ through the medium of the pivoted short levers $c^4$ and the pivoted ends of the handles M themselves. Thus the gang is raised any height, or the depth of the furrows regulated.

In changing the beams E and F on the bearing-rod D from one position to the other in all the forms shown and described, the small removable collars $d'$ $d'$ are used for separating the beams and spacing them the right distance, any number being used and of any length.

Other forms than those described can be just as well constructed from my device—such as side harrows, field-harrows, potato-diggers, &c.—by merely substituting the requisite parts for those shown.

The beams are made adjustable for the purpose of allowing the frame to be lengthened or shortened and shifted, if necessary, from one side to the other in order to pitch the plowshares in any direction.

Many varied forms other than those shown could be used without in the least departing from the nature and principle of my invention.

Having thus described my invention, what I claim as new, and desire to secure by Letters Patent, is—

1. In a combined cultivator, the combination of the adjustable frame, the fertilizer-box at the forward end of the frame, and the cotton-planter at the rear portion thereof, the series of long and short plow-beams, with blades of different depths, the follower-hood, the driving mechanism, and the operating-levers, substantially as described.

2. In a combined cultivator, the combination of the adjustable frame, the fertilizer-box and cotton-planter, respectively situated at the front and rear of said frame, the stirring and agitating brushes and arms in the boxes, the feeding mechanisms of each operated by short levers, the clutch and drive-chain operating the motion of said boxes, the spline-lever, the lever attached thereto, and the levers connected to the feed-slides, operating simultaneously to release or throw the clutch and to open or stop the feed of each box and the feeding-pipes, substantially as and for the purposes specified.

3. In a combined cultivator, the combination of the adjustable frame, the series of long and short plow-beams with plows cutting different depths, the feeding-tubes following behind the fore and aft central plow-beams, the single box with double compartments and a hollow partition therein, the short shafting and gearing of said box, the feeding-wheels, the clutch and driving mechanism, the lever operating the same and the feed with one simultaneous operation, the raising and lowering beams, and the lever adjacent to the driver's seat operating the beams, substantially as described.

4. In a combined cultivator, the combination of the adjustable frame, means for converting the machine into a single cultivator, a gang-plow or straddle-plow by means of the removal of the boxes, and interchanging and substitution of parts, the handles, which may be pivoted, the brace-rods, the ratcheted strip engaging the plow-handle in raising or lowering it, and the weeder or scraper which may be applied to any one of the forms, substantially as and for the purposes specified.

5. The combination, in a combined cultivator, of the adjustable frame A, the plow-beams E and F, arranged as described, the hood L, the fertilizer-box H, and cotton-seed planter I, feed-pipes J and J', wheels C' C', axle-beam C, and the clutch mechanism and operating-levers, substantially as described.

In testimony whereof I affix my signature in presence of two witnesses.

D. LA MONT ASPINWALL.

Witnesses:
CHARLES S. HYER,
RUSSELL H. SCOTT.